United States Patent
Kim et al.

(10) Patent No.: US 10,452,777 B2
(45) Date of Patent: *Oct. 22, 2019

(54) DISPLAY APPARATUS AND CHARACTER CORRECTING METHOD THEREOF

(71) Applicant: SAMSUNG ELECTRONICS CO., LTD., Suwon-si (KR)

(72) Inventors: Byuk-sun Kim, Seoul (KR); Min-jin Kim, Pyeongtaek-si (KR); Sung-gook Kim, Seoul (KR); Yong-deok Kim, Anyang-si (KR); Sang-on Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/408,460

(22) Filed: Jan. 18, 2017

(65) Prior Publication Data

US 2017/0124063 A1     May 4, 2017

Related U.S. Application Data

(63) Continuation of application No. 14/059,990, filed on Oct. 22, 2013, now Pat. No. 9,600,467.

(30) Foreign Application Priority Data

Nov. 7, 2012     (KR) .................. 10-2012-0125438

(51) Int. Cl.
*G06F 17/00*     (2006.01)
*G06F 17/27*     (2006.01)
(Continued)

(52) U.S. Cl.
CPC .......... *G06F 17/273* (2013.01); *G06F 3/0236* (2013.01); *G06F 3/0237* (2013.01);
(Continued)

(58) Field of Classification Search
CPC .... G06F 17/273; G06F 3/0236; G06F 3/0237; G06F 3/04845; G06F 3/04883; G06F 3/04886
(Continued)

(56) References Cited

U.S. PATENT DOCUMENTS 3,980,994 A     9/1976 Ying et al.
5,550,930 A *  8/1996 Berman ................ G06K 9/033
                                                  382/187
(Continued)

FOREIGN PATENT DOCUMENTS

CN     102236638 A    11/2011
EP      1662373 A1     5/2006
(Continued)

OTHER PUBLICATIONS

Rodrigues et al., Typing Race Games as a Method to Create Spelling Error Corpora, Google Scholar 2012, pp. 3019-3024.*
(Continued)

*Primary Examiner* — Cong-Lac Huynh
(74) *Attorney, Agent, or Firm* — Sughrue Mion, PLLC

(57) ABSTRACT

A character correcting method of a display apparatus includes displaying a sentence including at least one word in a character input window; displaying, if one of the at least one word is selected, a first user interface (UI) in which the at least one selected word is displayed by a character unit; and, displaying, if one of a plurality of characters displayed in the first UI is selected, a second UI around the selected character, the second UI is configured to edit the selected character.

20 Claims, 18 Drawing Sheets

(51) Int. Cl.
*G06F 17/24* (2006.01)
*G06F 3/023* (2006.01)
*G06F 3/0488* (2013.01)
*G06F 3/0484* (2013.01)

(52) U.S. Cl.
CPC ...... *G06F 3/04845* (2013.01); *G06F 3/04883* (2013.01); *G06F 3/04886* (2013.01); *G06F 17/24* (2013.01)

(58) Field of Classification Search
USPC ...................................................... 715/257
See application file for complete search history.

(56) References Cited

U.S. PATENT DOCUMENTS

| | | | |
|---|---|---|---|
| 5,790,115 | A | 8/1998 | Pleyer et al. |
| 6,260,015 | B1* | 7/2001 | Wang ..................... G06K 9/033 704/257 |
| 6,411,315 | B1 | 6/2002 | Young |
| 6,785,869 | B1 | 8/2004 | Berstis |
| 6,989,822 | B2 | 1/2006 | Pettiross et al. |
| 7,098,896 | B2 | 8/2006 | Kushler et al. |
| 7,143,350 | B2 | 11/2006 | Jurion et al. |
| 7,562,296 | B2 | 7/2009 | Soin et al. |
| 7,778,821 | B2 | 8/2010 | Mowatt et al. |
| 7,957,955 | B2 | 6/2011 | Christie et al. |
| 8,082,145 | B2 | 12/2011 | Mowatt et al. |
| 8,321,786 | B2 | 11/2012 | Lunati |
| 8,656,296 | B1 | 2/2014 | Ouyang et al. |
| 8,701,032 | B1* | 4/2014 | Zhai ..................... G06F 3/04886 715/773 |
| 8,704,783 | B2 | 4/2014 | Davis et al. |
| 8,896,552 | B2* | 11/2014 | Tan ....................... G06F 3/0488 345/173 |
| 8,963,864 | B2 | 2/2015 | Imamura |
| 9,081,482 | B1* | 7/2015 | Zhai ..................... G06F 3/0482 |
| 9,715,489 | B2* | 7/2017 | Pasquero ............. G06F 17/273 |
| 2005/0099406 | A1* | 5/2005 | Pettiross ............... G06F 3/0236 345/179 |
| 2005/0125217 | A1 | 6/2005 | Mazor |
| 2005/0262442 | A1 | 11/2005 | Soin et al. |
| 2005/0283726 | A1 | 12/2005 | Lunati |
| 2006/0111890 | A1 | 5/2006 | Mowatt et al. |
| 2008/0143692 | A1* | 6/2008 | Borgaonkar ....... G06K 9/00436 345/179 |
| 2008/0244387 | A1 | 10/2008 | Fux et al. |
| 2008/0270118 | A1* | 10/2008 | Kuo ..................... G06F 17/2223 704/9 |
| 2009/0044284 | A1* | 2/2009 | Govindaraju .......... G06F 21/31 726/30 |
| 2009/0058823 | A1* | 3/2009 | Kocienda .............. G06F 3/0236 345/173 |
| 2009/0174667 | A1* | 7/2009 | Kocienda .............. G06F 3/0237 345/169 |
| 2009/0315740 | A1 | 12/2009 | Hildreth et al. |
| 2010/0265257 | A1 | 10/2010 | Mowatt et al. |
| 2010/0293460 | A1 | 11/2010 | Budelli |
| 2011/0035209 | A1* | 2/2011 | MacFarlane .......... G06F 3/0237 704/9 |
| 2011/0179353 | A1 | 7/2011 | Wood |
| 2012/0131520 | A1 | 5/2012 | Tang et al. |
| 2012/0200503 | A1* | 8/2012 | Berenger ............ G06F 3/04886 345/168 |
| 2012/0306772 | A1 | 12/2012 | Tan et al. |
| 2013/0179778 | A1 | 7/2013 | Lee et al. |
| 2013/0246329 | A1* | 9/2013 | Pasquero ............. G06F 17/276 706/52 |
| 2013/0257741 | A1 | 10/2013 | Kong |
| 2013/0263039 | A1* | 10/2013 | Fahlgren ............... G06F 3/0489 715/780 |
| 2014/0085292 | A1 | 3/2014 | Avrahami |
| 2014/0195903 | A1 | 7/2014 | Kaasila et al. |
| 2014/0309984 | A1* | 10/2014 | Bostick ................. G06F 17/273 704/9 |
| 2014/0317495 | A1 | 10/2014 | Lau et al. |
| 2016/0202906 | A1 | 7/2016 | Abuelsaad |

FOREIGN PATENT DOCUMENTS

| | | |
|---|---|---|
| KR | 10-2006-0058006 A | 5/2006 |
| KR | 10-2006-0133428 A | 12/2006 |
| KR | 10-0838818 B1 | 6/2008 |
| KR | 10-2010-0089630 A | 8/2010 |
| WO | 2006/137670 A1 | 12/2006 |

OTHER PUBLICATIONS

Duraham et al., Spelling Correction in User Interfaces, ACM 1983, pp. 764-773.*
Whitelaw et al., Using the Web for Language Independent Spellchecking and Autocorrection, Google Scholar 2009, pp. 890-899. (Year: 2009).*
Dunlop et al., Multidimensional Pareto Optimization of Touchscreen Keyboards for Speed, Familiarity and Improved Spell Checking, ACM 2012, pp. 2669-2678. (Year: 2012).*
Communication dated May 30, 2014, issued by the European Patent Office in counterpart European Application No. 13190957.4.
Communication dated May 8, 2015, issued by the European Patent Office in counterpart European Application No. 13190957.4.
Communication dated Feb. 10, 2016, issued by the European Patent Office in counterpart European Patent Application No. 13190957.4.
Communication dated Nov. 30, 2016, issued by the European Patent Office in counterpart European Patent Application No. 13190957.4.
Vertanen, et al. "Efficient Correction Interfaces for Speech Recognition", University of Cambridge, Apr. 30, 2009, 284 pages total, XP055186483, http://search.proquest.com/docview/898759842.
Office Action issued in parent U.S. Appl. No. 14/059,990 dated Dec. 7, 2015.
Final Office Action issued in parent U.S. Appl. No. 14/059,990 dated Jun. 9, 2016.
Notice of Allowance issued in Parent U.S. Appl. No. 14/059,990 dated Oct. 7, 2016.
Communication dated Aug. 11, 2017 by the State Intellectual property Office of P.R. China in counterpart Chinese Patent Application No. 201310551824.3.
Communication dated Mar. 14, 2018, issued by the State Intellectual Property Office of P.R. China in counterpart Chinese application No. 201310551824.3.
Communication dated Oct. 24, 2017, issued by the European Patent office in counterpart European application No. 13190957.4.
Communication dated Aug. 3, 2018, issued by the State Intellectual property Office of the People's Republic of China in counterpart Chinese patent Application No. 201310551824.3.
Office Action dated Jan. 30, 2019 by the State Intellectual Property Office of P.R. China in counterpart Chinese Patent Application No. 201310551824.3.
Office Action dated Feb. 21, 2019 by the Korean Intellectual Priperty Office in counterpart Korean Patent Application No. 10-2012-0125438.
Communication dated Aug. 7, 2019 issued by the Korean Intellectual Property Office in counterpart Korean Application No. 10-2012-0125438.

* cited by examiner

DISPLAY APPARATUS AND CHARACTER CORRECTING METHOD THEREOF

CROSS-REFERENCE TO RELATED APPLICATIONS

This application is a continuation of U.S. application Ser. No. 14/059,990 filed Oct. 22, 2013, which claims the benefit under 35 U.S.C. § 119(a) from Korean Patent Application No. 10-2012-0125438 filed Nov. 7, 2012 in the Korean Intellectual Property Office, the disclosures of which are incorporated herein by reference in their entirety.

BACKGROUND

1. Field

Embodiments relate to a display apparatus, and a character correcting method of the display apparatus. More particularly, embodiments relate to a display apparatus that can correct some of a plurality of characters, which are displayed in a character input window of the display apparatus, and a character correcting method of the display apparatus.

2. Description of the Related Art

Related art display apparatuses can perform a variety of functions such as a broadcast receiving function, an internet search function, a call function, etc. In particular, since the display apparatus can provide a variety of functions, the display apparatus may include a variety of input methods, such as voice recognition, motion recognition, and a pointing device as well as an existing remote controller.

On the other hand, as a variety of functions are employed in the display apparatus, the display apparatus can receive characters in order to search a variety of information, or to perform various functions. In particular, related art display apparatuses can receive characters by using voice recognition or input devices.

However, when the characters are entered using voice input or a remote controller, a misrecognition or misinput frequently occurs. Therefore, some of the input characters may need to be corrected. Therefore, a user is inconvenienced by having to correct the characters, one by one through the remote controller.

Accordingly, a user may need an easier and more convenient way to correct characters that are incorrectly entered by using the variety of input methods.

SUMMARY

Exemplary embodiments have been developed in order to overcome the drawbacks and other problems associated with the related art. An aspect of the exemplary embodiments provides a display apparatus that displays user interfaces (UIs) for editing around characters that a user wants to correct such that the user can more easily and comfortably correct characters that are incorrectly entered, and a character correcting method of the display apparatus.

According to an aspect of an exemplary embodiment, there is provided a character correcting method of a display apparatus, which may include displaying a sentence including at least one word in a character input window; displaying, if one of the at least one word is selected, a first user interface (UI) in which the at least one selected word is displayed by a character unit; and displaying, if one of a plurality of characters displayed in the first UI is selected, a second UI around the selected character, the second UI is configured to edit the selected character.

The second UI may include at least one of a delete item for deleting the selected character and an insert item for inserting a blank space in front of the selected character.

The delete item may be arranged at a bottom of the selected character, and the insert item may be arranged at a top of the selected character.

The character correcting method may include, when the display apparatus is controlled depending on a user motion, if, after the character is selected, a first motion of the user is input and detected, and the first user motion moves in a downward direction while maintaining the first motion, deleting the selected character, and if, after the character is selected, the first motion of the user is input and detected, and the first user motion moves in a upward direction while maintaining the first motion, inserting a blank space in which a character can be entered in front of the selected character.

The character correcting method may include, when the display apparatus is controlled by a pointing device, if, after the character is selected, a user command in which the pointing device moves in a downward direction is input, deleting the selected character; and if, after the character is selected, the user command in which the pointing device moves in a upward direction is input, inserting a blank space in which a character can be entered in front of the selected character.

The character correcting method may include providing, if one of the plurality of characters of the selected word is selected, at least one recommended word using the plurality of characters except for the selected character.

The character correcting method may include changing, if a user command is input to select one of the plurality of characters in order to change the selected character after the second UI is displayed, the previously selected character to a newly selected character; and displaying the newly selected character.

The user command is input using voice recognition in order to select one of the plurality of characters and change the selected character.

When the display apparatus is controlled depending on a user motion, if, after the first UI is displayed, a second motion of the user is input and detected, and the second user motion moves in a left direction or a right direction while maintaining the second motion of the user, multi-characters, of the plurality of characters displayed in the first UI, may be selected.

According to another aspect of an exemplary embodiment, there is provided a display apparatus which may include a display which displays a sentence including at least one word in a character input window; an input unit which receives a user command; and a controller which controls the display to display, if one of the at least one word is selected through the input unit, a first user interface (UI) in which the at least one selected word is displayed by a character unit, and a second UI around the selected character, the second UI is configured to edit the selected character if one of the plurality of characters displayed in the first UI is selected through the input unit.

The second UI may include at least one of a delete item for deleting the selected character and an insert item for inserting a blank space in front of the selected character.

The controller may control the display to position the delete item at a bottom of the selected character, and to position the insert item at a top of the selected character.

The input unit may include a motion input unit configured to receive a user motion, if, after the character is selected, a first motion of the user is input and detected through the motion input unit, and the first user motion moves in a downward direction while maintaining the first motion, the controller may delete the selected character, and if, after the character is selected, the first motion of the user is input and detected through the motion input unit, and the first user motion moves in a upward direction while maintaining the first motion, the controller may insert a blank space in which a character can be inserted in front of the selected character.

The input unit may include a pointing device, if, after the character is selected, a user command in which the pointing device moves in a downward direction is input, the controller may delete the selected character; and if, after the character is selected, the user command in which the pointing device moves in a upward direction is input, the controller may insert a blank space in which a character can be input in front of the selected character.

If one of the plurality of characters of the at least one selected word is selected, the controller may provide at least one recommended word using the plurality of characters except for the selected character.

If a user command is input in order to select one of the plurality of characters and change the selected character after the second UI is displayed, the controller may control the display to change the previously selected character to a newly selected character and display the newly selected character.

The input unit may include a voice input unit configured to receive a voice the user utters, and the controller may recognize the voice of the user entered through the voice input unit, and may change the selected character to a different character.

The input unit may include a motion input unit configured to receive a user motion, and if, after the first UI is displayed, a second motion of the user is input and detected through the motion input unit, and the second user motion moves in a left direction or a right direction while maintaining the second motion of the user, the controller may select multi-characters, of the plurality of characters displayed in the first UI.

According to another aspect of an exemplary embodiment, there is provided a character correcting method of a display apparatus, which may include inputting a sentence comprising at least one word to the display apparatus; selecting one of the at least one word from the sentence; displaying the one selected word on the display apparatus; selecting a character of the one selected word; and displaying a user interface (UI) around the selected character. The UI may be configured to edit the sentence comprising the at least one word.

Other objects, advantages, and salient features of the exemplary embodiments will become apparent from the following detailed description, which, taken in conjunction with the annexed drawings, discloses preferred embodiments.

BRIEF DESCRIPTION OF THE DRAWINGS

These and/or other aspects and advantages of the exemplary embodiments will become apparent and more readily appreciated from the following description of the embodiments, taken in conjunction with the accompanying drawings of which.

Throughout the drawings, like reference numerals will be understood to refer to like parts, components and structures.

DETAILED DESCRIPTION OF THE EXEMPLARY EMBODIMENTS

Hereinafter, certain exemplary embodiments of the present disclosure will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

Figure 1:
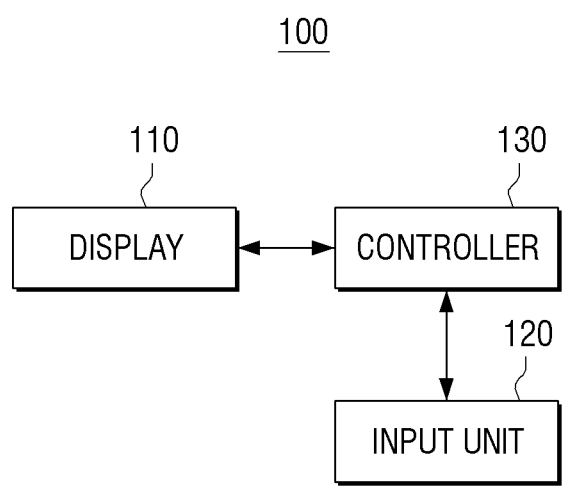
FIG. 1 is a block diagram illustrating a configuration of a display apparatus according to an embodiment of the exemplary embodiments.

FIG. 1 is a block diagram illustrating a configuration of a display apparatus according to an embodiment of the exemplary embodiments. As illustrated in FIG. 1, a display apparatus 100 includes a display 110, an input unit 120, and a controller 130. At this time, the display apparatus 100 may be implemented as a smart TV. However, embodiments are not limited. Therefore, the display apparatus 100 may be implemented as various display apparatuses, such as a monitor, a projector, a tablet PC, a smart phone, etc.

The display 110 outputs image data depending on control of the controller 130. In particular, the display 110 may display a character input window and a virtual keyboard for information searching. Also, the display 110 may display a first UI in which a word selected from the character input window is displayed by a character unit, and a second UI for editing a selected character around the character selected from a plurality of characters displayed in the first UI. Further, the display 110 may display recommended words stored in an external server or a storage unit (not illustrated).

The input unit 120 receives a user command to control the display apparatus 100. Particularly, the input unit 120 may receive various user commands for inputting and editing characters.

Particularly, the input unit 120 may be implemented as a variety of input devices. For example, the input unit 120 may be implemented as a voice input unit to receive a voice that a user utters, a motion input unit to receive a user's motion by photographing the user's motion, a pointing device, a mouse, a remote controller, etc.

The controller 130 controls overall operation of the display apparatus 100, depending on the user command entered through the input unit 120. Particularly, when a sentence, including at least one word, is displayed in the character input window of the display 110, if one of the at least one word is selected through the input unit 120, the controller 130 displays the first UI in which the selected word is displayed by a character unit. Then, if one of the plurality of characters displayed in the first UI is selected through the input unit 120, the controller 130 displays the second UI for editing the selected character around the selected character.

At this time, the second UI may include at least one of a delete item to delete the selected character, and an insert item to insert a blank space in front of the selected character.

Then, the controller 130 may edit the selected character through the various input devices of the input unit 120 by using the second UI.

For example, when the delete item is positioned at the bottom of the selected character and the insert item is positioned at the top of the selected character, if a first motion of a user is detected through the motion input unit, and a user motion that moves in a downward direction while maintaining the first motion is detected, the controller 130 performs a function to delete the selected character. Further, if the first motion of the user is detected through the motion input unit, and a user motion moves in a upward direction while maintaining the first motion is input, the controller 130 performs a function to insert a black space in which a character can be input in front of the selected character.

When the delete item is positioned below the selected character and the insert item is positioned above the selected character, if a user inputs a command in which a pointing device moves downwardly, the controller 130 may delete the selected character, and if a user inputs a command in which the pointing device moves upwardly, the controller 130 may insert a black space in which a character can be input in front of the selected character.

In addition, if one of a plurality of characters of the selected word is selected, the controller 130 may provide at least one recommended word by using the rest of the characters, except for the selected character. For example, if the selected word is "chind", and "n" of the plurality of characters is selected, the controller 130 may provide recommended words such as "child", etc. by using the rest of the characters except for "n".

After the second UI is displayed, if a user command to select one of the plurality of characters in order to change the selected character is input, the controller 130 may change the previously selected character to a newly selected character, and may display the newly selected character. In other words, the user does not insert a black space in front of the selected character or delete the selected character, but may replace the selected character with a new character.

Further, when changing at least one of the plurality of characters of the selected word to another character, the controller 130 may change the selected character to another character by recognizing a user voice entered through the voice input unit of the input devices of the input unit 120.

With the display apparatus 100, the user may more easily correct typographic errors using a variety of input devices.

Figure 2:
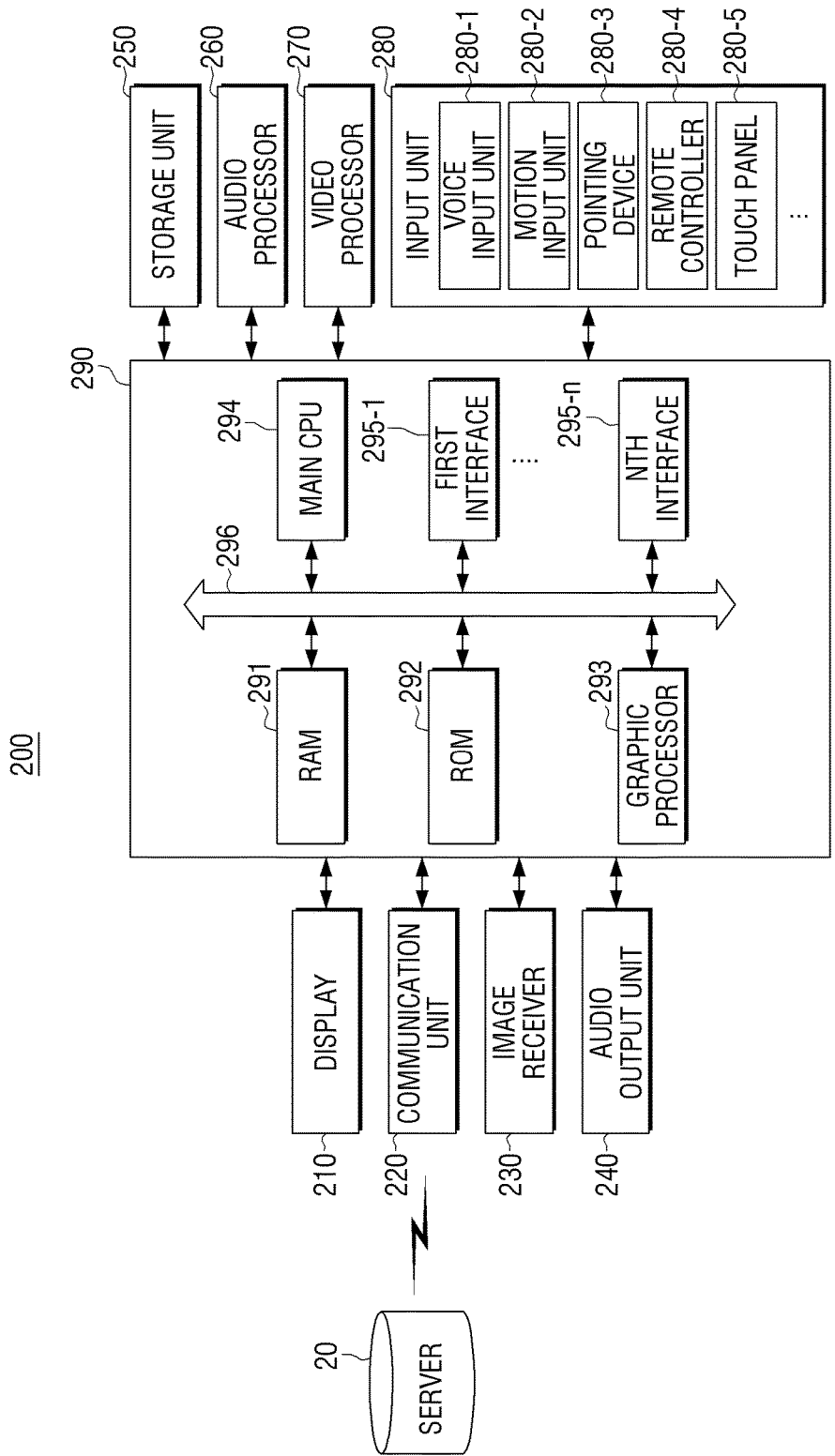
FIG. 2 is a block diagram illustrating a detailed configuration of a display apparatus according to an embodiment of the exemplary embodiments.

Hereinafter, embodiments of the present disclosure will be described in detail with reference to FIGS. 2 to 13. FIG. 2 is a block diagram illustrating a detailed configuration of a display apparatus 200, according to an embodiment of the exemplary embodiments. Referring to FIG. 2, the display apparatus 200 includes a display 210, a communication unit 220, an image receiver 230, an audio output unit 240, a storage unit 250, an audio processor 260, a video processor 270, an input unit 280, and a controller 290.

On the other hand, FIG. 2 illustrates various components of an apparatus having a variety of functions, such as a communication function, a broadcast receiving function, a video playback function, a display function, etc. The apparatus is one example of the display apparatus 200. Accordingly, according to embodiments, some of the components illustrated in FIG. 2 may be omitted or changed, or other components may be added to the components.

The display 210 displays at least one of video frames into which the video processor 270 processes image data received from the image receiver 230 and various screens generated in a graphic processor 293. In particular, the display 210 may display a character input window and a virtual keyboard for inputting characters. In order to correct a character, the display 210 may display a first UI which displays a word selected from a sentence displayed in the character input window by a character unit, and a second UI for editing the character selected in the first UI.

The communication unit 220 performs communication with various types of external devices or servers 20 depending on various types of communication. The communication unit 220 may include a variety of communication chips, such as a wi-fi chip, a Bluetooth chip, a near field communication (NFC) chip, a wireless communication chip, etc. At this time, the wi-fi chip, the Bluetooth chip, and the NFC chip may perform communication in the wi-fi method, the Bluetooth method, and the NFC method, respectively. The NFC chip refers to a chip operating in the near field communication (NFC) method that uses a band of 13.56 MHz of a variety of RF-ID frequency bands such as 135 kHz, 13.56 MHz, 433 MHz, 860-960 MHz, 2.45 GHz, etc. When the wi-fi chip or the Bluetooth chip is used, the communication unit 220 may first transmit and receive various connecting information such as SSID, a session key, etc., and then may perform a communication connection using the connecting information to transmit and receive various types of information. The wireless communication chip refers to a chip to perform communication according to various communication specifications, such as IEEE, ZigBee, third generation (3G), third generation partnership project (3GPP), long term evolution (LTE), etc.

The image receiver 230 receives image data through a variety of sources. For example, the image receiver 230 may receive broadcast data from external broadcast stations, and may receive image data from the external devices (e.g., a DVD device).

The audio output unit 240 is configured to output not only various audio data processed in the audio processor 260, but also various types of notification sounds or voice messages.

The storage unit 250 stores a variety of modules to drive the display apparatus 200. For example, the storage unit 250 may store software including a base module, a sensing module, a communication module, a presentation module, a web browser module, and a service module. At this time, the base module is a basic module that processes signals transmitted from each of hardware included in the display apparatus 200, and sends them to upper layer modules. The sensing module is a module that collects information from a various types of sensors. Then, the sensing module analyzes and manages the collected information, and may include a face recognition module, a voice recognition module, a motion recognition module, a NFC recognition module, etc. The presentation module is a module to form a display screen, and may include a multimedia module to play and output multimedia content and an UI rendering module to perform a process of UI and graphic. The communication module is a module to perform communication with external devices. The web browser module refers to a module that accesses web servers by performing web browsing. The service module is a module that includes a various kinds of applications to provide various services.

As described above, the storage unit 250 may include various program modules. However, some of the various types of program modules may be omitted, changed, or added depending on types and characteristics of the display apparatus 200. For example, if the above-described display apparatus 200 is implemented as a tablet PC, the base module may further include a location determination unit for determining a GPS-based location, and the sensing module may further include a sensing module to detect motions of a user.

The audio processor 260 is a component to perform a process about the audio data. The audio processor 260 may perform a variety of processes such as decoding, amplifying, noise filtering, etc. for the audio data. The audio data processed in the audio processor 260 may be output through the audio output unit 240.

The video processor 270 is a component to perform a process for image data that is received from the image receiver 230. The video processor 270 may perform various image processes, such as decoding, scaling, noise filtering, frame rate conversion, resolution conversion, etc., for the image data.

The input unit 280 receives user commands to control the overall operation of the display apparatus 200. Particularly, the input unit 280 may receive user commands to input or edit characters by using a variety of UIs displayed on the display 210.

As illustrated in FIG. 2, the input unit 280 may be implemented as a variety of input devices, such as a voice input unit 280-1, a motion input unit 280-2, a pointing device 280-3, a remote controller 280-4, a touch panel 280-5, etc. At this time, the voice input unit 280-1 receives a user voice. The voice input unit 280-1 converts the input voice signals into electrical signals, and outputs them to the controller 290. For example, the voice input unit 280-1 may be implemented as a microphone. Also, the voice input unit 280-1 may be integrated with the display apparatus 200 (i.e., all-in-one) or in separated from the display apparatus 200. The separated voice input unit 280-1 may be connected to the display apparatus 200 through a wire or a wireless network. At this time, the motion input unit 280-2 receives image signals to photograph the motion of the user (e.g., consecutive frames). Thus, the motion input unit 280-2 provides them to the controller 290. For example, the motion input unit 280-2 may be implemented as a camera unit, consisting of lenses and an image sensor. Also, the motion input unit 280-2 may be integrated with or separated from the display apparatus 200. The separated motion input unit 280-2 may be connected to the display apparatus 200 through a wire or a wireless network.

The controller 290 controls the overall operation of the display apparatus 200 by using a variety of programs stored in the storage unit 250.

As illustrated in FIG. 2, the controller 290, includes a RAM 291, a ROM 292, a graphic processor 293, a main CPU 294, first to nth interfaces 295-1-295-n, and a bus 296. At this time, the RAM 291, the ROM 292, the graphic processor 293, the main CPU 294, and the first to nth interfaces 295-1-295-n may be connected to each other through the bus 296.

The ROM 292 stores a command set for system booting, etc. If a turn-on command is input and the power is supplied, the main CPU 294, depending on the command stored in the ROM 292, copies an operating system (O/S) stored in the storage unit 250, pastes the operating system in the RAM 291, and executes the operating system to boot the system. After the booting is completed, the main CPU 294 copies various types of application programs stored in the storage unit 250 into the RAM 291. The main CPU 294 executes the application program copied in the RAM 291 to perform various types of operations.

The graphic processor 293 generates a screen, including various objects such as icons, images, text, etc. by using a calculation unit (not illustrated) and a rendering unit (not illustrated). The calculation unit calculates property values of each of the objects, such as coordinate values, shapes, sizes, colors, etc., depending on the layout of the screen, using a control command received from the input unit 280. The rendering unit generates various layouts of screens that contain the objects based on the property values calculated in the calculation unit. The screen generated in the rendering unit is displayed within a display area of the display 210.

The main CPU 294 accesses the storage unit 250. Thus, the main CPU 294 performs booting by using the O/S stored in the storage unit 250. The main CPU 294 performs various operations by using a variety of programs, content, data, etc. stored in the storage unit 250.

The first to nth interfaces 295-1 to 295-n are connected to various components. One of the interfaces may be a network interface that is connected to external devices through a network.

Figure 3:
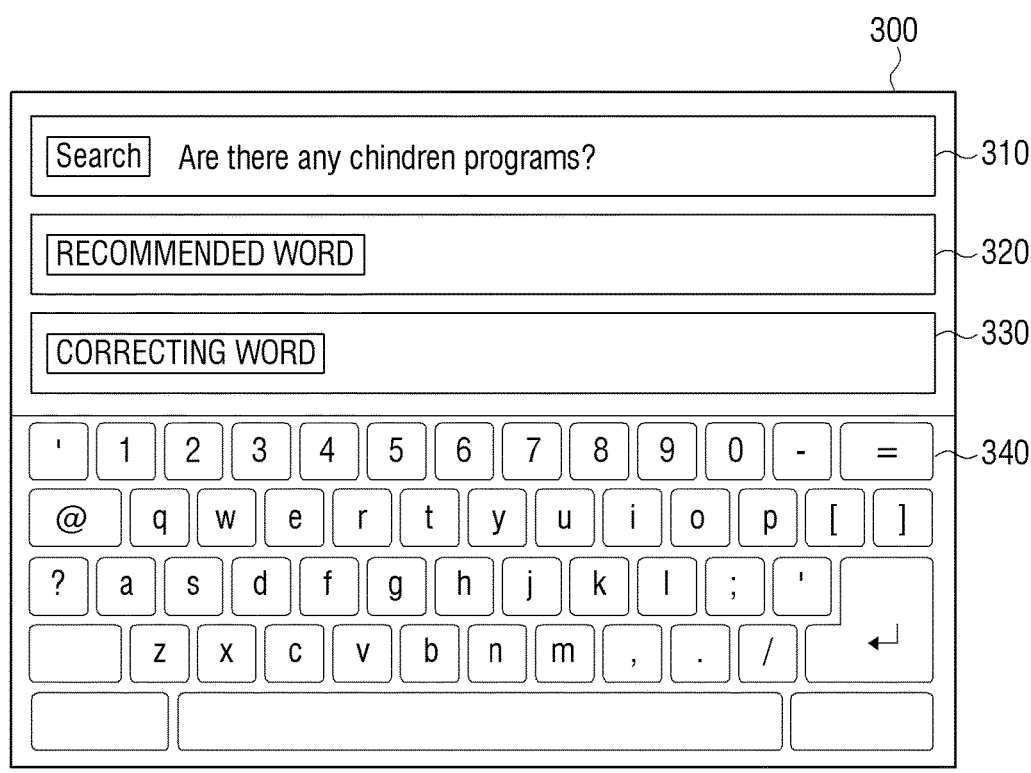
FIGS. 3 to 13 are views for explaining a character correcting method according to various embodiments of the exemplary embodiments.

In particular, as illustrated in FIG. 3, the controller 290 may control the display 210 to display a character input screen 300 for character input. At this time, as illustrated in FIG. 3, the character input screen 300 may include a first area 310 in which a character input window is displayed, a second area 320 to provide recommended words, a third area 330 to display a selected word by a character unit, and a fourth area 340 in which a virtual keyboard is displayed.

After the character input screen 300 is displayed, if one word of a sentence displayed in the character input window of the first area 310 is selected, the controller 290 may control the display 210 to display a first UI that displays the selected word by a character unit in the third area 330. For example, as illustrated in FIG. 4, if a pointer 350 is moved to "chindren" based on the user command entered through the input unit 280, the controller 290, may control the display 210 to display the first UI that displays the "chindren" of the selected word by a character unit in the third area 330.

Figure 15:
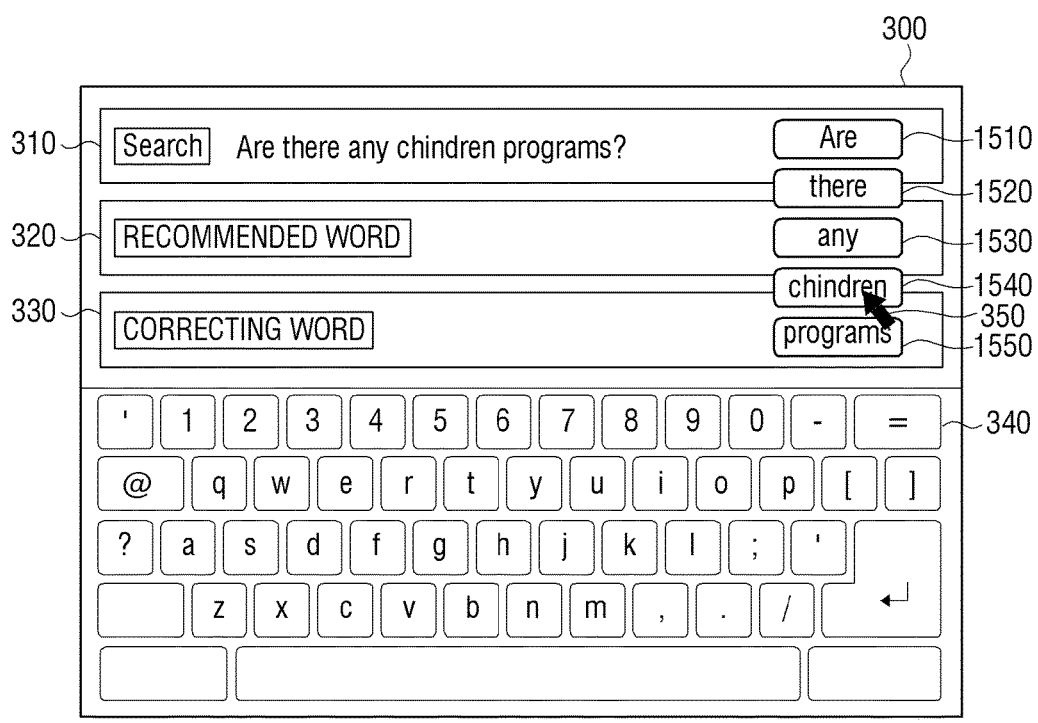
FIGS. 15 to 18 are views for explaining a character correcting method according to various embodiments of the exemplary embodiments.

At this time, for a user convenience to select a word, the controller 290 may divide the sentence displayed in the character input window by a word unit, and then may display the divided words. For example, as illustrated in FIG. 15, when "Are there any chindren programs?" is displayed in the character input window, the controller 290 may control the display 210 to display a plurality of items 1510, 1520, 1530, 1540, and 1550 matched to each of the plurality of words contained in the sentence. At this time, if one of the pluralities of items 1510, 1520, 1530, 1540, and 1550 is selected, the controller 290 may control the display 210 to display the first UI which displays a word corresponding to the selected item by a character unit in the third area 330. For example, as illustrated in FIG. 4, if a fourth item 1540 of the plurality of items 1510, 1520, 1530, 1540, and 1550 is selected, the controller 290 may control the display 210 to display the first UI that displays "chindren" of a word corresponding to the selected fourth item 1540 by a character unit in the third area 330.

Figure 5:
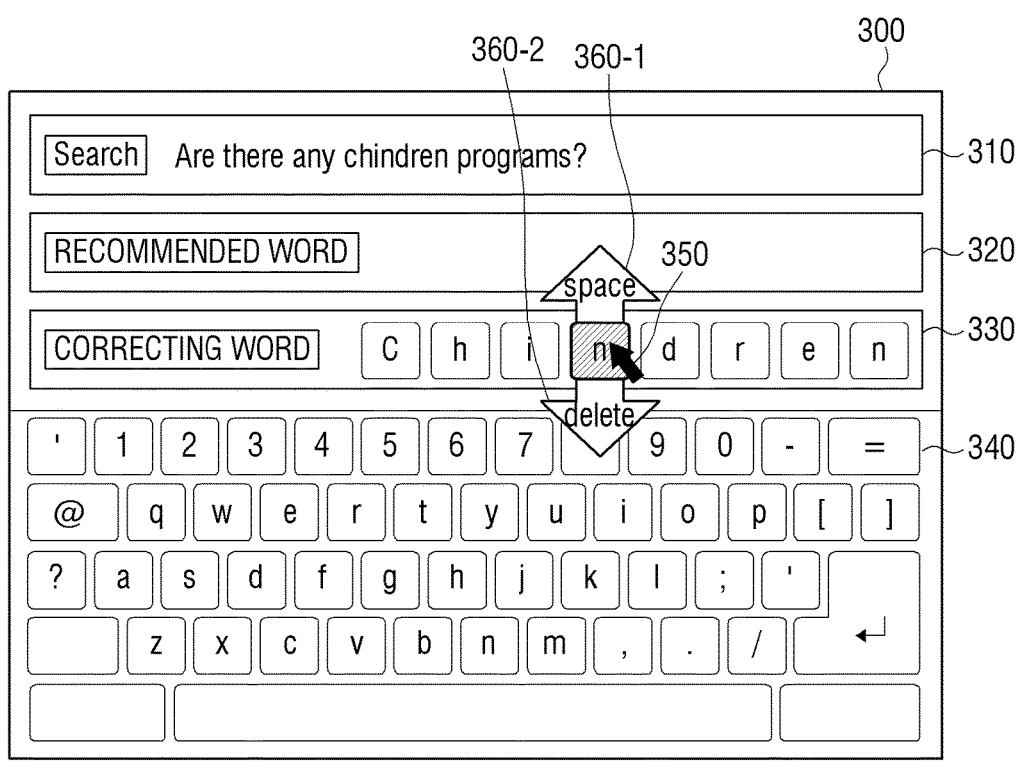

If one of the pluralities of characters that are contained in the first UI displayed in the third area 330 is selected, the controller 290 may control the display 210 to display a second UI for editing a selected character around the selected character. For example, as illustrated in FIG. 5, if "n" of the first UI displayed in the third area 330 is selected through the input unit 280, the controller 290 may control the display 210 to display an insert item 360-1 for inserting a blank space at the top of the selected character "n" and a delete item 360-2 for deleting the selected character at the bottom of the selected character "n".

Figure 4:
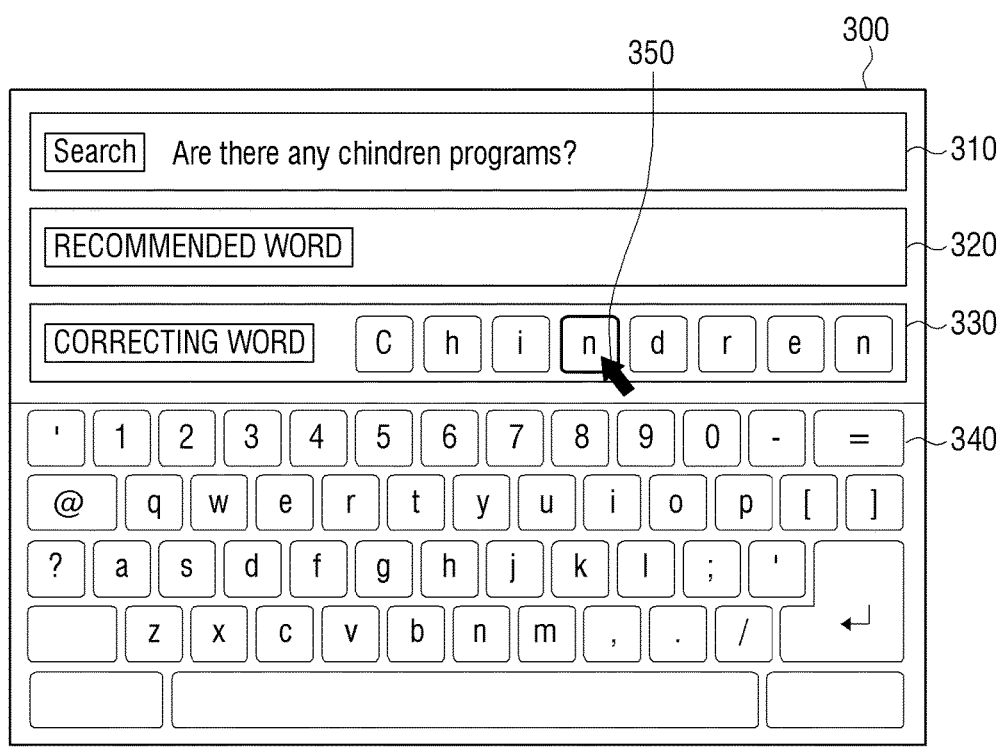

As illustrated in FIG. 4, a method to select one character of the first UI displayed in the third area 330 may be a method to select a character that the user wants to select from the first UI displayed in the third area 330. However, this is only one example. Therefore, the character may be selected and synchronized with the character input window. For example, when one of characters displayed in the character input window of the first area 310 is selected by using the pointer 350, the controller 290 may control the display 210 to display the second UI 360-1 and 360-2 around the selected character.

Figure 6:
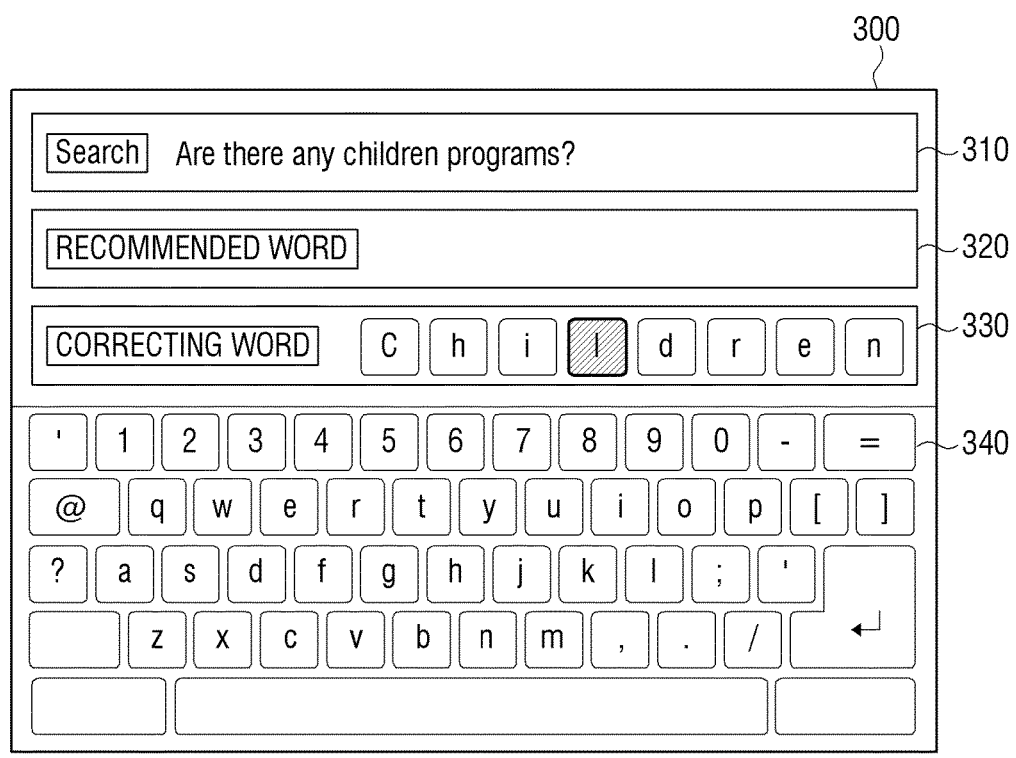

If the user selects a new character through the input unit 280 while the second UI is being displayed, the controller 290 may change the character around which the second UI is displayed for the newly selected character. Thus, the user may display the newly selected character. For example, as illustrated in FIGS. 5-6, if the user selects "l" using the virtual keyboard while the second UI 360-1 and 360-2 is being displayed around the "n", the controller 290 may control the display 210 to change the "n" for "l" and then to display the "l".

However, using the virtual keyboard in order to select a new character is only one example. Thus, the new character may be selected using different methods. For example, if the user utters "l" through the voice input unit 280-1 while the second UI 360-1 and 360-2 is being displayed around the "n", the controller 290 may recognize the uttered voice of the user such that the controller 290 may control the display 210 to change the "n" to "l", and then display the "l".

Figure 7:
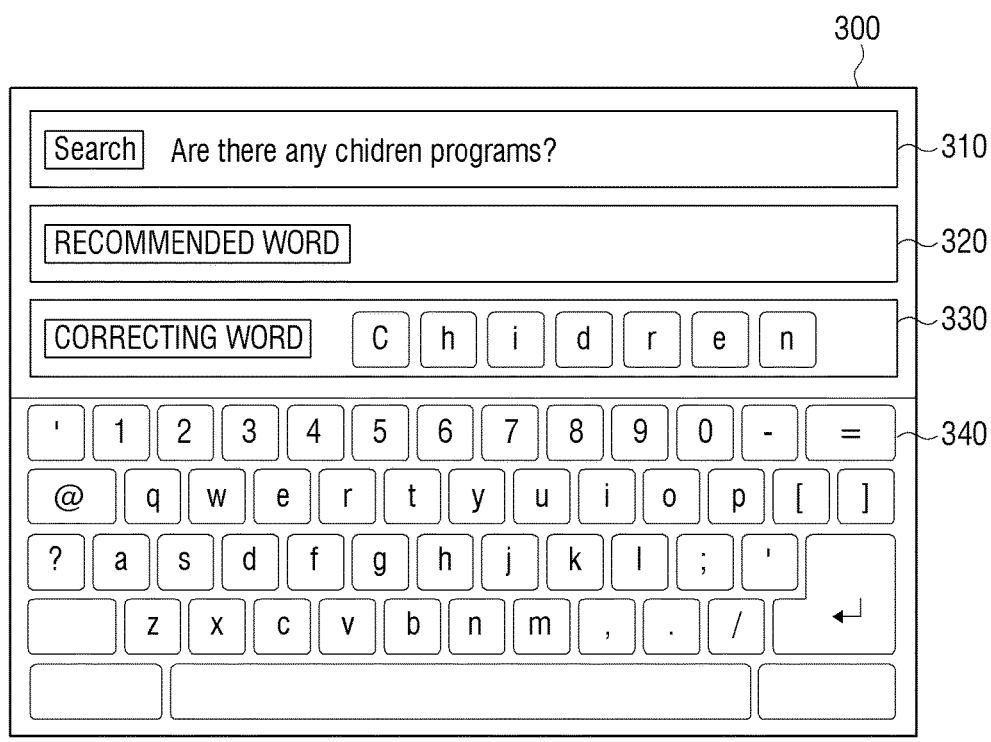
Figure 8:
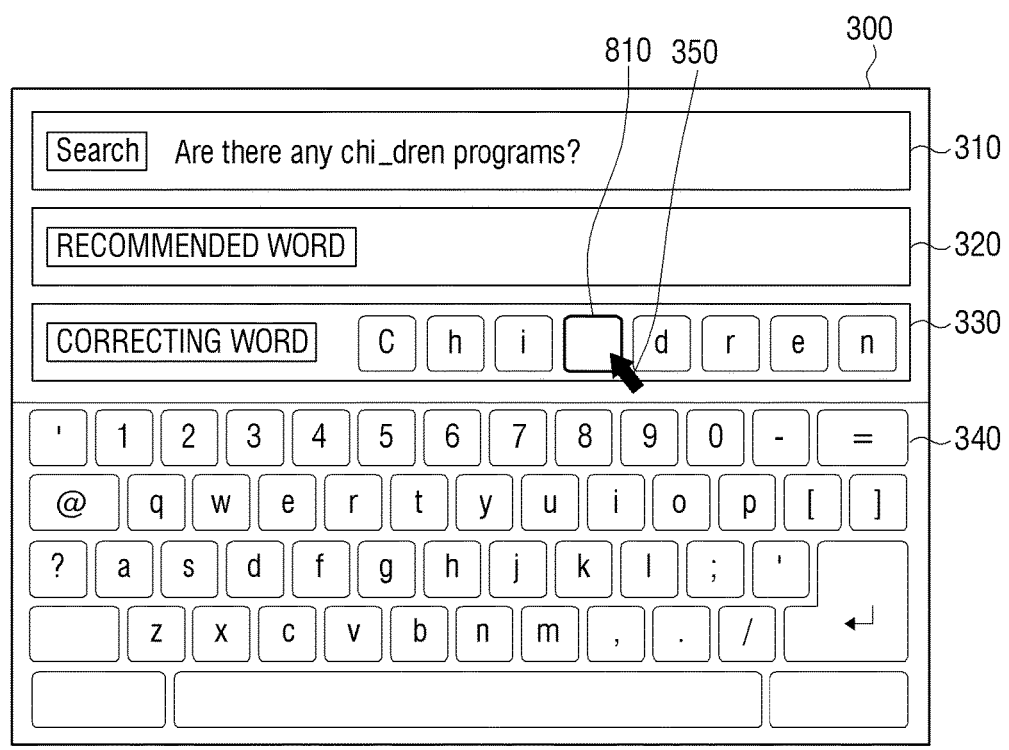

Also, if a user command to select the second UI 360-1 and 360-2 is input through the input unit 280, the controller 290 may perform an editing function corresponding to the second UI selected by the user command. For example, as illustrated in FIGS. 5 and 7, if a user command corresponding to a downward direction is entered through the input unit 280 while the second UI 360-1 and 360-2 is being displayed, the controller 290 may delete the selected character "n". Alternatively, as illustrated in FIGS. 5 and 8, if a user command corresponding to an upward direction is entered through the input unit 280 while the second UI 360-1 and 360-2 is being displayed, the controller 290 may insert a blank space 810 in front of the selected character "n".

On the other hand, according to embodiments of the exemplary embodiment, a user command corresponding to the downward direction or the upward direction may be received in a variety of ways. For example, if a user command in which a user moves in the upward or downward direction while maintaining a first motion (e.g., a hand grasping motion) input through the motion input unit 280-2, the controller 290 may edit the selected character depending on the direction corresponding to the user command. Alternatively, if the user command in which the user moves in the upward or downward direction is input through the pointing device 280-3, the controller 290 may edit the selected character depending on the direction corresponding to the user command. Alternatively, if the user command in which the user moves in the upward or downward direction is input through the touch panel 280-5, the controller 290 may edit the selected character depending on the direction corresponding to the user command.

Figure 9:
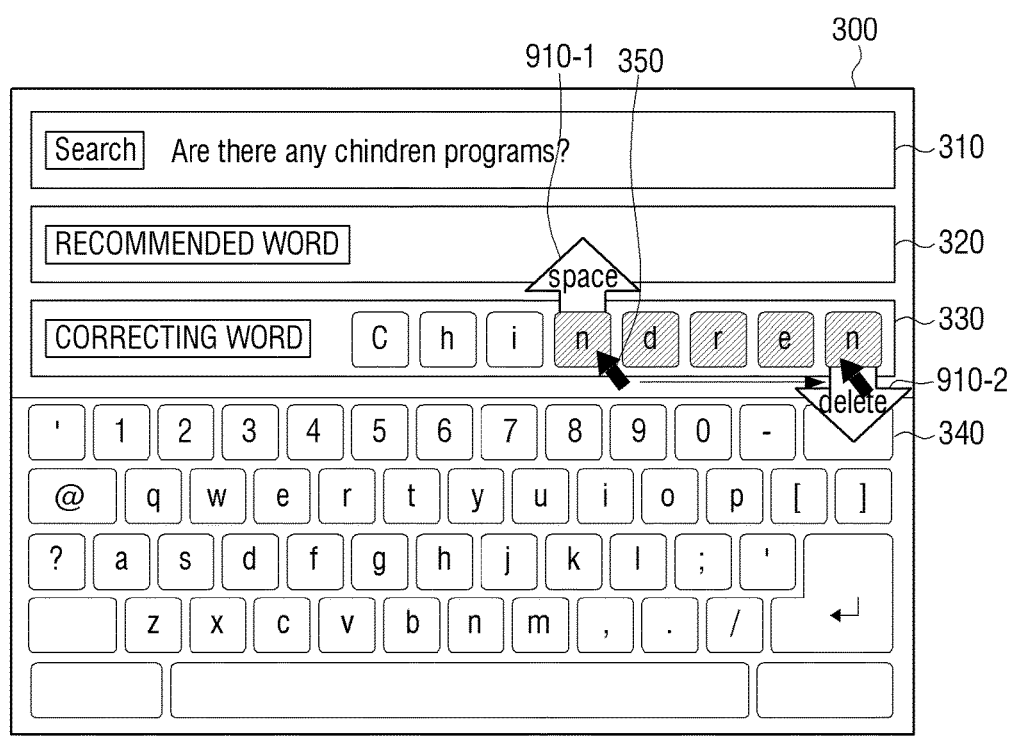
Figure 10:
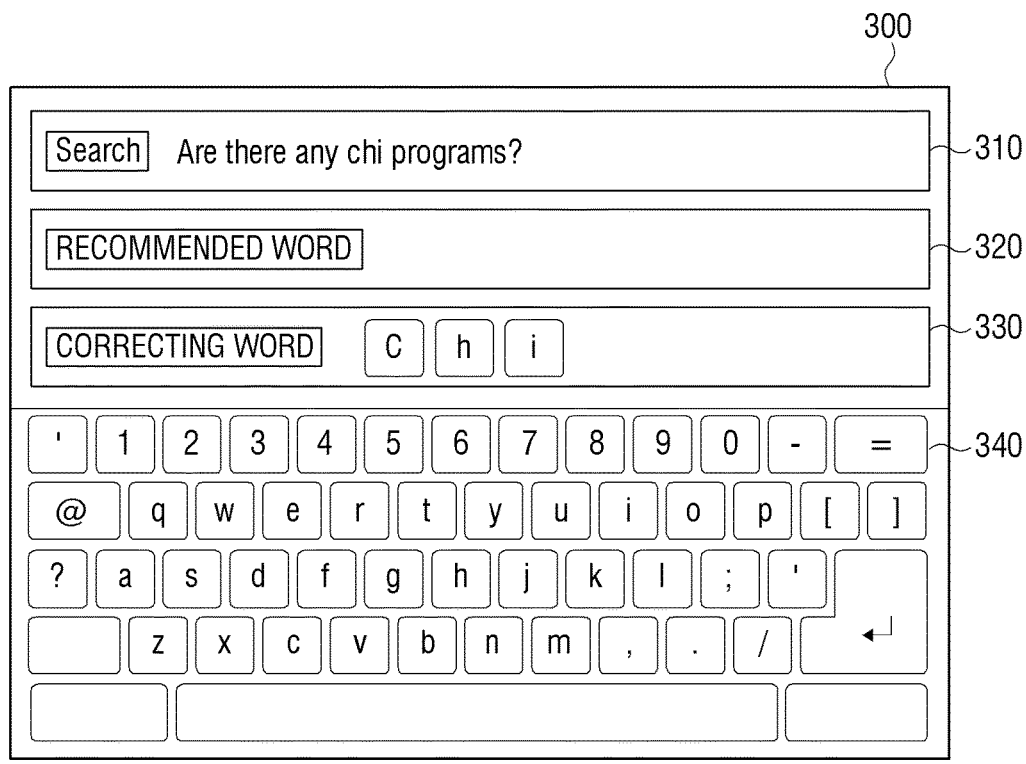

In addition, the controller 290 may select at least two of the plurality of characters of the first UI depending on the user command entered through the input unit 280. For example, as illustrated in FIG. 9, if a drag command until a position of next "n" in a state where the pointer 350 is positioned at a first "n" (e.g., a command that the user moves in the right direction while maintaining the first motion) is entered, the controller 290 may select "n", "d", "r", "e", and "n". At this time, an insert item 910-1 of the second UI may be displayed at the top of the first character "n", and a delete item 910-2 of the second UI may be displayed at the bottom of the last character "n". As illustrated in FIGS. 9 and 10, if the user command corresponding to the downward direction is entered in order to select the delete item in the state in which the plurality of characters are selected, the controller 290 may delete all the selected characters.

Figure 11:
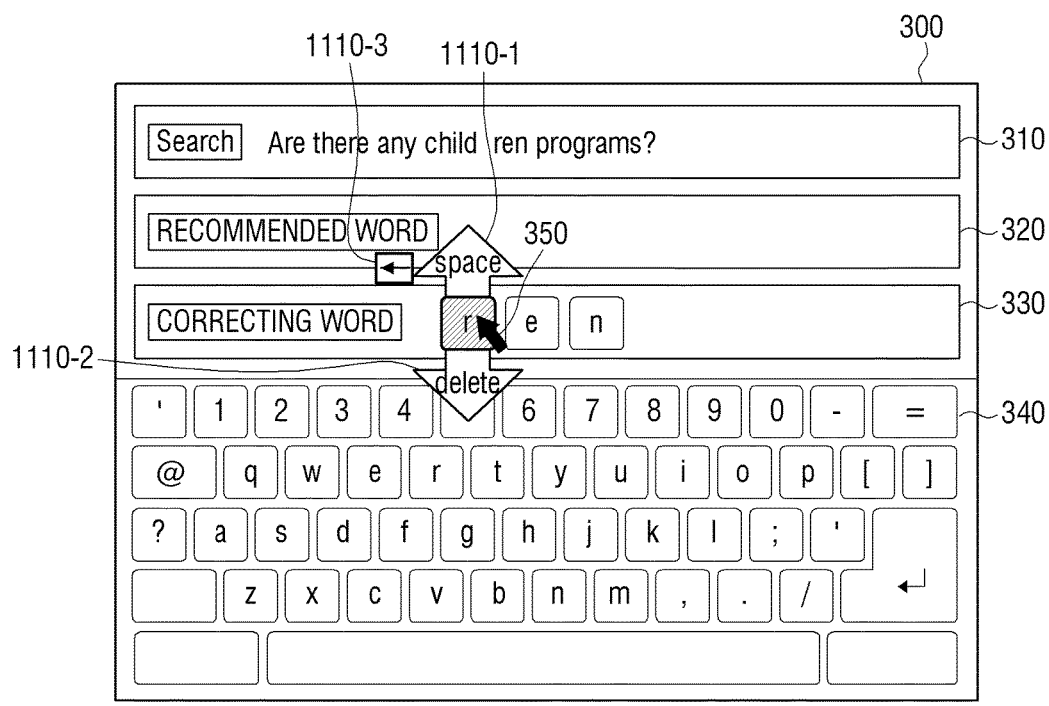

Also, the second UI may provide a UI for modifying word spacing. For example, as illustrated in FIG. 11, when "child" and "ren" are spaced apart from each other, if the "ren" is selected through the pointer 350, the controller 290 may display the first UI that displays the "ren" by a character unit in the third area 330. As illustrated in FIG. 11, if the user command to select the "r" is input, the controller 290 may control the display 210 to display a back item 1110-3, as well as an insert item 1110-1 and a delete item 1110-2. If the back item 1110-3 is selected, the controller 290 may delete a blank space between the "child" and "ren".

Figure 12:
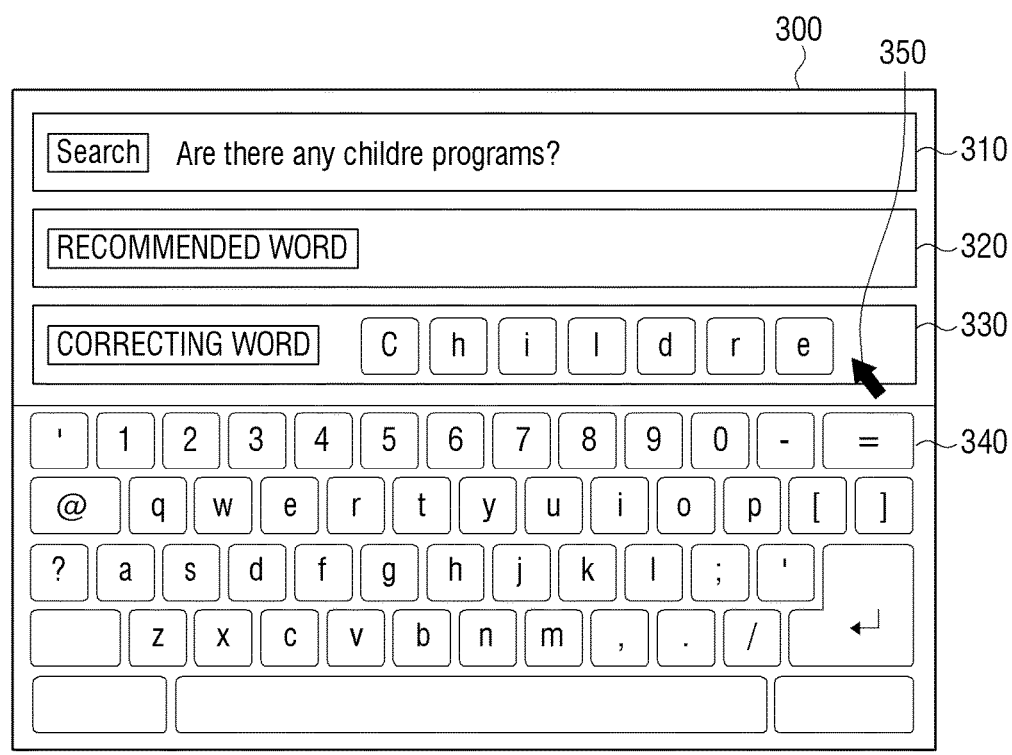
Figure 13:
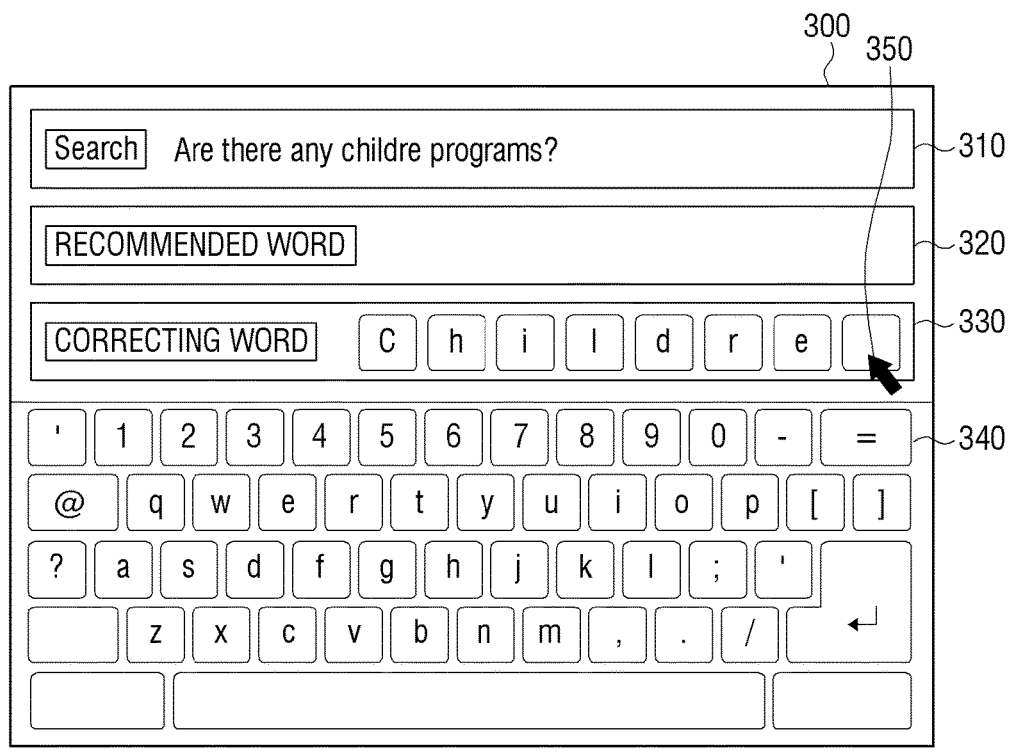

In addition, if an area next to the last character of the first UI displayed in the third area 330 is selected, the controller 290 may insert a blank space next to the last character. For example, as illustrated in FIGS. 12 and 13, if "childre" is selected in the character input window, and a user command to select an area next the last character "e" in the third area 330 is entered through the input unit 280, the controller 290 may insert a blank space 1310 next to the last character "e".

Figure 16:
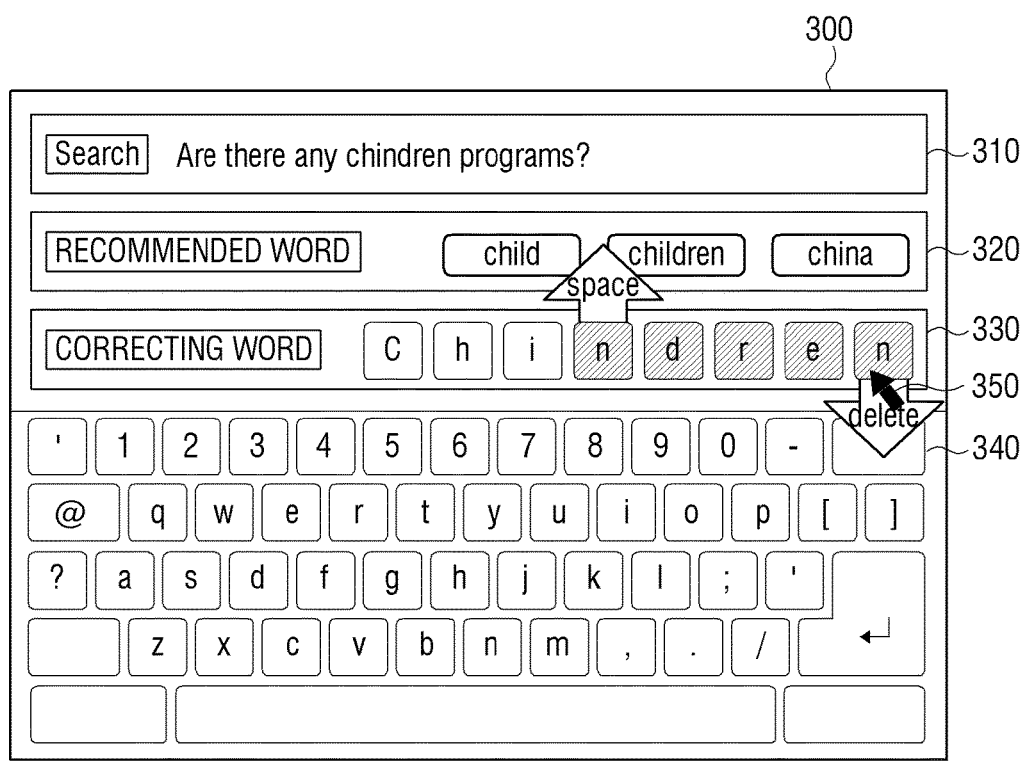

If at least one of a plurality of characters of the selected word is selected, the controller 290 may provide recommended words by using the rest of the characters, except for the selected characters. For example, when the selected word is "chindren", if "n" is located in the middle of the plurality of characters, the controller 290 may display the recommended words such as "children", etc. in the second area 320 by using the rest of characters except for the "n" located in the middle of the selected word. Alternatively, as illustrated in FIG. 16, when the selected word is "chindren", if "ndren" is selected from the plurality of characters through a drag operation (e.g., the user moves in the right or left direction while maintaining grasping operation), the controller 290 may display the recommended words such as "child", "children", and "china" in the second area 320 by using the rest of characters except for the "ndren". At this time, the controller 290 may be provided with the recommended words from the external server 20 through the communication unit 220.

Figure 17:
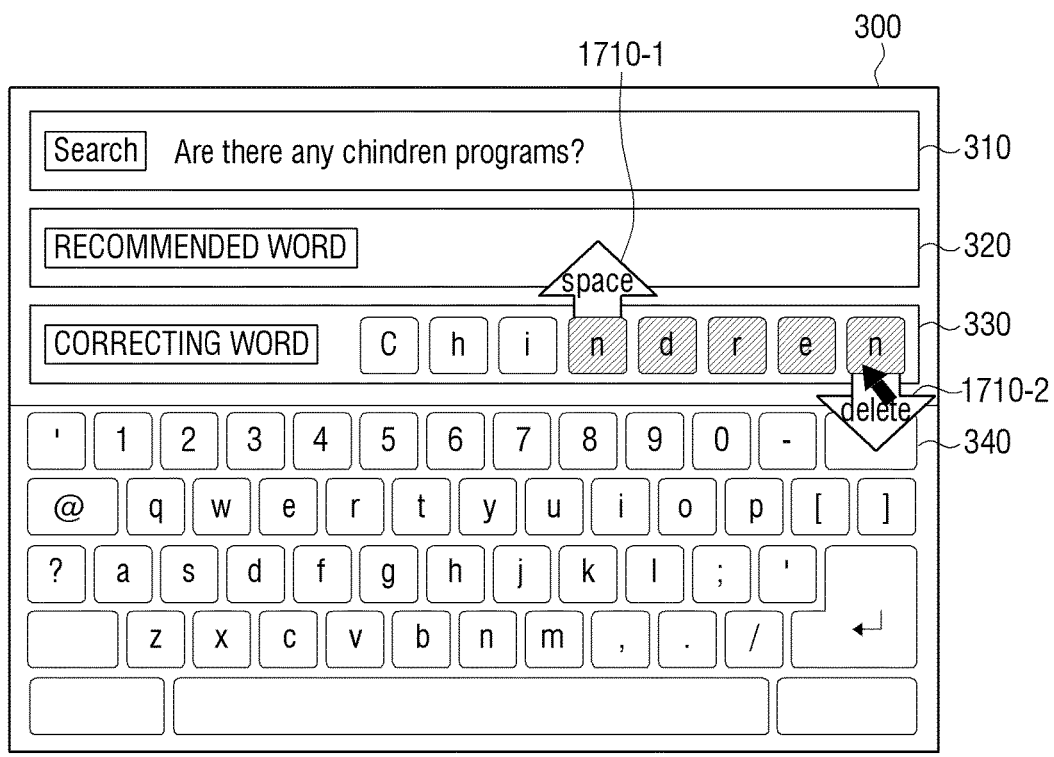
Figure 18:
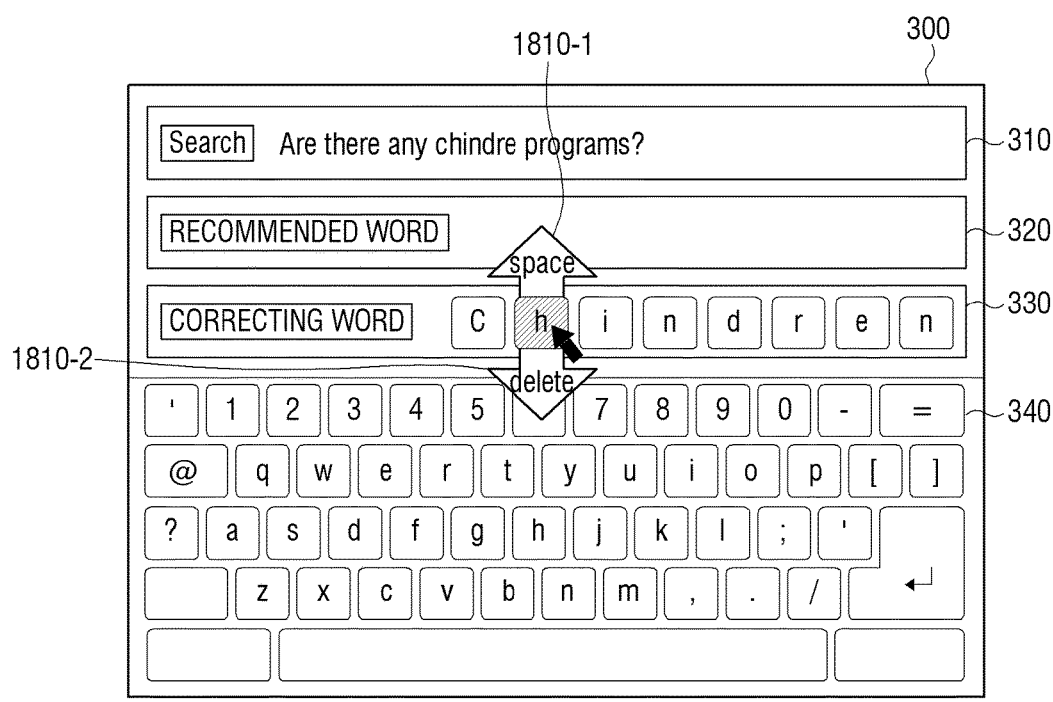

In addition, if the user selects a second character of the first UI after selecting a first character of the first UI through the input unit 280, the controller 290 may control the display 210 to deselect the first character, to newly select the second character, and to display the second UI around the second character selected newly. For example, as illustrated in FIGS. 17 and 18, if, after "ndren" of the first UI is selected, "h" is newly selected from the first UI, the controller 290 may control the display 210 to display the second UI 1810-1 and 1810-2 around the selected "h". At this time, the second character may newly be selected by using the pointer 350 or the user voice.

With various embodiments of the exemplary embodiments, the user can more easily and comfortably correct typographic errors by using various types of input devices.

Figure 14:
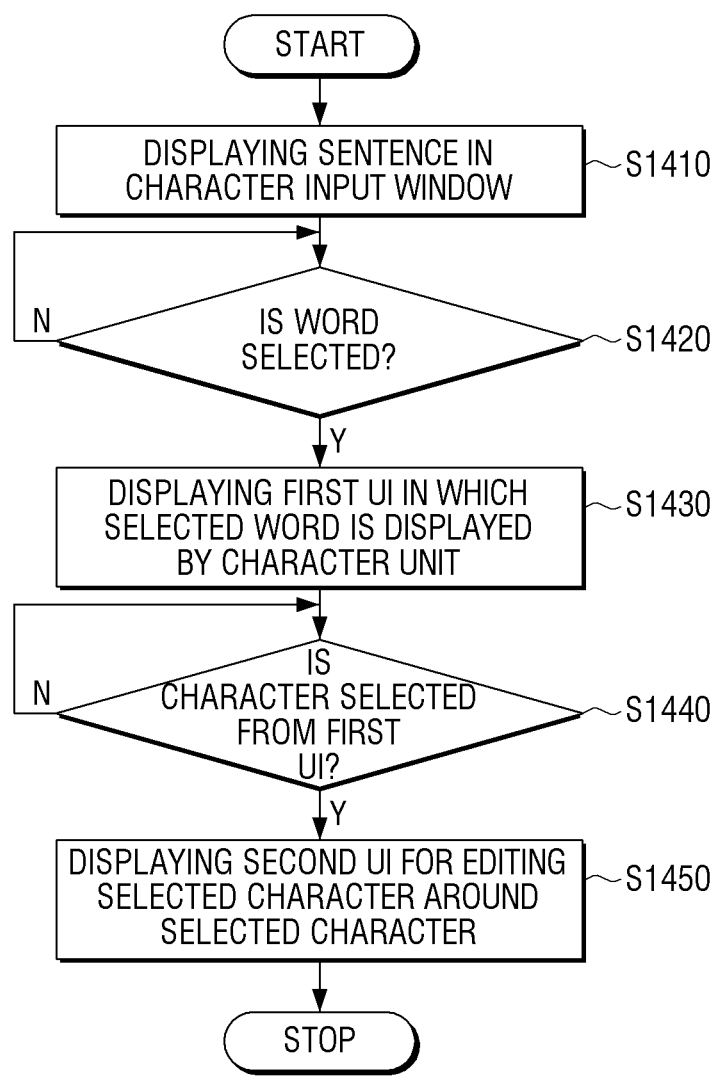
FIG. 14 is a flowchart for explaining a character correcting method of a display apparatus according to an embodiment of the exemplary embodiments.

Hereinafter, a character correcting method of the display apparatus 200 will be described in detail with reference to FIG. 14.

First, the display apparatus 200 displays a sentence in the character input window (S 1410). At this time, the display apparatus 200 may display the sentence consisting of a plurality of words.

The display apparatus 200 determines whether one word is selected from the sentence of the character input window (S 1420). At this time, the display apparatus 200 may select a plurality of words displayed in the character input window by using a pointer.

If a word is selected (S 1420-Y), the display apparatus 200 may display a first UI in which the selected word is displayed by a character unit (S 1430).

Then, the display apparatus 200 determines whether one character is selected from the first UI (S 1440). At this time, the display apparatus 200 may select the character by using one of a user command to select one character from the first UI, and a user command to select one character from the sentence displayed in the character input window.

Then, if one character is selected from the first UI (S 1440-Y), the display apparatus 200 displays a second UI for editing the selected character around the selected character (S 1450). At this time, the second UI may include a delete item for deleting the selected character, an insert item for inserting a blank space in front of the selected character, etc.

As described above, since the second UI for editing characters is used, the user can easily correct characters that are incorrectly entered by using various types of input devices.

On the other hand, in an embodiment of the exemplary embodiments, the delete item and insert item are described as the second UI for editing the selected character. However, this is only one example. Therefore, the second UI may include various edit items (for example, an enter item, etc.).

Also, the character correcting method of the display apparatus according to various embodiments of the exemplary embodiments may be implemented as a program. Thus, the program may be provided with the display apparatus.

In detail, a non-transitory computer-readable medium, in which a program that includes steps of displaying a sentence including at least one word in a character input window, if one of the at least one word is selected, displaying a first UI in which the selected word is displayed by a character unit, and, if one of the plurality of characters displayed in the first UI is selected, displaying a second UI for editing a selected character around the selected character is stored, may be provided.

The non-transitory computer-readable medium means not a medium to store data for a short moment like a register, a cache, a memory, etc., but a medium that can store data in a semi-permanent and can be read by devices. In detail, the various applications or programs as described above may be stored in the non-transitory computer readable medium, such as a CD, a DVD, a hard disc, a Blue-ray disc, an USB, a memory card, a ROM, etc.

While the embodiments of the exemplary embodiments have been described, additional variations and modifications of the embodiments may occur to those skilled in the art once they learn of the basic embodiments. Therefore, it is intended that the appended claims shall be construed to include both the above embodiments and all such variations and modifications that fall within the spirit and scope of the exemplary embodiments.

What is claimed is:

1. A character correcting method of a display apparatus, the character correcting method comprising:
    displaying at least one word in a character input window;
    displaying, in response to one of the at least one word displayed in the character input window being selected, a first graphical user interface (GUI) in which the selected word is displayed by a character unit; and
    displaying, in response to one of a plurality of characters displayed in the first GUI being selected, a second GUI at a top area and a bottom area of the selected character, the second GUI being used to edit the selected character.

2. The character correcting method of claim 1,
    wherein the display apparatus is controlled depending on a user manipulation, and
    wherein the second GUI comprises at least one of a delete item for deleting the selected character and an insert item for inserting a blank space in front of the selected character.

3. The character correcting method of claim 2, wherein the delete item is arranged at the bottom area of the selected character.

4. The character correcting method of claim 2, wherein the insert item is arranged at the top area of the selected character.

5. The character correcting method of claim 1, further comprising:
    providing, in response to one of the plurality of characters of the at least one selected word being selected, at least one recommended word using the plurality of characters except for the selected character.

6. The character correcting method of claim 1, further comprising:
    changing, in response to a user command being input to select one of the plurality of characters in order to change the selected character after the second GUI is displayed, the previously selected character to a newly selected character; and
    displaying the newly selected character.

7. The character correcting method of claim 1, wherein the display apparatus is controlled depending on a motion of a user, and
    in response to detecting that, after the first GUI is displayed, the motion of the user is input and detected, and the motion of the user moves in a left direction or a right direction while maintaining the motion of the user, multi-characters, of the plurality of characters displayed in the first GUI, are selected.

8. A display apparatus comprising:
    a display which displays at least one word in a character input window;
    an input unit which receives a user manipulation; and
    a controller which controls the display to display, in response to one of the at least one word displayed in the character input window being selected through the input unit, a first graphical user interface (GUI) in which the selected word is displayed by a character unit, and display, in response to one of a plurality of characters displayed in the first GUI being selected through the input unit, a second GUI at a top area and a bottom area of the selected character, the second GUI being used to edit the selected character.

9. The display apparatus of claim 8, wherein
the second GUI comprises at least one of a delete item for deleting the selected character and an insert item for inserting a blank space in front of the selected character.

10. The display apparatus of claim 9, wherein
the controller controls the display to position the delete item at the bottom area of the selected character.

11. The display apparatus of claim 9, wherein
the controller controls the display to position the insert item at the top area of the selected character.

12. The display apparatus of claim 8, wherein,
in response to one of the plurality of characters of the at least one selected word selected, the controller provides at least one recommended word using the plurality of characters except for the selected character.

13. The display apparatus of claim 8, wherein,
in response to a user command being input to select one of the plurality of characters in order to change the selected character after the second GUI is displayed, the controller controls the display to change the previously selected character to a newly selected character and display the newly selected character.

14. A character correcting method of a display apparatus, the character correcting method comprising:
displaying a word comprising a plurality of characters in a character input window;
displaying, in response to one of the plurality of characters being selected, a graphical user interface (GUI) at a top area and a bottom area of the selected character, the GUI being configured to edit the selected character; and
displaying a virtual keyboard configured to replace the selected character with a character entered on the virtual keyboard.

15. The character correcting method of claim 14,
wherein the display apparatus is controlled depending on a user manipulation, and
wherein the GUI comprises at least one of a delete item for deleting the selected character and an insert item for inserting a blank space in front of the selected character.

16. The character correcting method of claim 15, wherein the delete item is arranged at the bottom area of the selected character.

17. The character correcting method of claim 15, wherein the insert item is arranged at the top area of the selected character.

18. The character correcting method of claim 14, further comprising:
providing, in response to one of the plurality of characters being selected, at least one recommended word using the plurality of characters except for the selected character.

19. The character correcting method of claim 14, further comprising:
changing, in response to a user command being input to select one of the plurality of characters in order to change the selected character after the GUI is displayed, the previously selected character to a newly selected character entered via the virtual keyboard; and
displaying the newly selected character.

20. The character correcting method of claim 14, wherein
the display apparatus is controlled depending on a motion of a user, and
in response to detecting that, after the word is displayed, the motion of the user is input and detected, and the motion of the user moves in a left direction or a right direction while maintaining the motion of the user, multiple characters, of the plurality of characters included in the word, are selected.

* * * * *